US009571496B1

(12) United States Patent
Agarwal et al.

(10) Patent No.: US 9,571,496 B1
(45) Date of Patent: *Feb. 14, 2017

(54) CENTRAL ACCOUNT MANAGER

(71) Applicant: Google Inc., Mountain View, CA (US)

(72) Inventors: Naveen Agarwal, Fremont, CA (US);
Eric Sachs, Redwood City, CA (US);
Guibin Kong, Sunnyvale, CA (US);
Mengcheng Duan, Sunnyvale, CA
(US); Brian Eaton, Mountain View,
CA (US)

(73) Assignee: Google Inc., Mountain View, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 14/318,308

(22) Filed: Jun. 27, 2014

Related U.S. Application Data

(63) Continuation of application No. 13/653,325, filed on Oct. 16, 2012, now Pat. No. 8,789,147.

(51) Int. Cl.
G06F 7/04 (2006.01)
G06F 15/16 (2006.01)
G06F 17/30 (2006.01)
H04L 29/06 (2006.01)

(52) U.S. Cl.
CPC .................... H04L 63/10 (2013.01)

(58) Field of Classification Search
CPC ........ H04L 63/08; H04L 63/10; H04L 63/101; G06F 21/31; G06F 21/62

USPC ............................................. 726/4
See application file for complete search history.

(56) References Cited

U.S. PATENT DOCUMENTS

2005/0288967 A1* 12/2005 Zammit ................ G06Q 50/24
705/3
2006/0149595 A1* 7/2006 Williams ............... G06Q 40/08
705/2
2008/0028050 A1* 1/2008 Fiducci ............ G06F 17/30194
709/220
2010/0250398 A1* 9/2010 Susilo .................... G06Q 30/02
705/26.1
2012/0084210 A1* 4/2012 Farahmand ........ G06Q 20/3226
705/64

* cited by examiner

Primary Examiner — Kambiz Zand
Assistant Examiner — Stephen Sanders
(74) Attorney, Agent, or Firm — McDermott Will & Emery LLP

(57) ABSTRACT

A system and computer-implemented method including receiving a request from a service provider, at a central account manager, to provide a user account for a user logging into the first service provider, identifying one or more user accounts associated with the user at one or more user account providers maintained at the central account manager, selecting a first user account of the one or more user accounts and providing, using the one or more computing devices, the selected first user account to the first service provider in response to the request.

19 Claims, 5 Drawing Sheets

CENTRAL ACCOUNT MANAGER

CROSS-REFERENCE TO RELATED APPLICATION

The present application is a continuation of U.S. patent application Ser. No. 13/653,325 entitled "Central Account Manager," filed on Oct. 16, 2012, the disclosure of which is hereby incorporated by reference in its entirety for all purposes.

BACKGROUND

When a user attempts to log into a service provider, the user may log into the service provider using an existing as his/her user name at a user account (and additionally as his/her password). The user account may be linked with the user's account at the service provider, such that the user account is used to confirm the user's identity. When the user accesses the login page of the service provider, the user may be provided with a listing of user account providers that the user can choose to log into the service provider.

SUMMARY

The disclosed subject matter relates to a computer-implemented method including receiving, using one or more computing devices, a request from a service provider, at a central account manager, to provide a user account for a user logging into the first service provider. The method further including identifying, using the one or more computing devices, one or more user accounts associated with the user at one or more user account providers maintained at the central account manager. The method further including selecting, using the one or more computing devices, a first user account of the one or more user accounts. The method further including providing, using the one or more computing devices, the selected first user account to the first service provider in response to the request. Other aspects can be embodied in corresponding systems and apparatus, including computer program products.

These and other aspects can include one or more of the following features. The user accounts associated with the user may include one or more of user accounts previously accessed by the user, user accounts previously used by the user to access a service provider, or user accounts provided by the user to the central account manager. The method may further include retrieving a listing of user accounts maintained at the central account manager and selecting the one or more user accounts from the listing of user accounts based on information associated with the request. The information associated with the request may include one or more of information regarding the first service provider, information regarding the user, or information regarding similar service providers or similar users. The information regarding the first service provider may include one or more of the user accounts supported by the first service provider or user accounts previously used in association with the first service provider.

The method may further include receiving an indication of a new user account associated with the user and adding the new user account to the listing of user accounts at the central account manager. The indication may be received in response to the user account being used to access a service provider. The indication may be received in response to the user account being accessed independent of a service provider. The method may further include determining whether the new user account is an authorized user account, wherein the new user account is added when it is determined that the new user account is an authorized user account.

The listing of user accounts associated with the user may include at least one user account not previously used to access the first service provider. The service provider may include one of a website or application that requires user authentication before providing the user with access. The user account may be used at the service provider to authenticate the user to provide the user with access to the service provider. The central account manager may be remote and independent from the service provider.

The disclosed subject matter relates to a system including one or more processors and a machine-readable medium including instructions stored therein, which when executed by the processors, cause the processors to perform operations including receiving a request from a service provider, at a central account manager, to provide a user account associated with one or more user account providers for a user logging into the service provider. The operations may further include retrieving a listing of user accounts comprising one or more of user accounts of the user maintained at the central account manager. The operations may further include providing a first user account of the one or more user accounts to the service provider in response to the request. Other aspects can be embodied in corresponding systems and apparatus, including computer program products.

These and other aspects can include one or more of the following features. The operations may further include ranking the one or more user accounts of the listing of user accounts maintained at the central account manager based on information associated with the request and providing the listing of user accounts for display to the user according to the ranking.

The information associated with the request may include information regarding the first service provider, information regarding the user, and information regarding similar service providers or similar users. The information regarding the first service provider may include one or more of the user accounts supported by the first service provider or user accounts previously used in association with the first service provider.

The operations may further include receiving an indication of a new user account associated with the user. The operations may further include determining whether the new user account is an authorized user account. The operations may further include adding the new user account to the listing of user accounts at the central account manager when it is determined that the new user account is an authorized user account. The operations may further include providing the listing of user accounts for display to the user and receiving a selection of the first user account from the user.

The disclosed subject matter also relates to a machine-readable medium including instructions stored therein, which when executed by a machine, cause the machine to perform operations including receiving a request from a first service provider, at a central account manager, to provide a user account for a user logging into the first service provider, wherein the listing of user accounts includes one or more user accounts maintained at one or more user account providers. The operations may further include receiving a selection of a first user account of the one or more user accounts. The operations may further include providing the selected first user account to the first service provider in response to the request, wherein the first service provider requires user authentication before providing the user with access and wherein the selected first user account is used at the first service provider to authenticate the user and provide the user with access to the first service provider. Other aspects can be embodied in corresponding systems and apparatus, including computer program products. These and other aspects can include one or more of the following features.

These and other features described throughout the subject disclosure provide various advantages, including, but not limited to, providing a centralized listing of user accounts such as identity providers for use by a user to gain access to a website or webpage that requires authentication.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
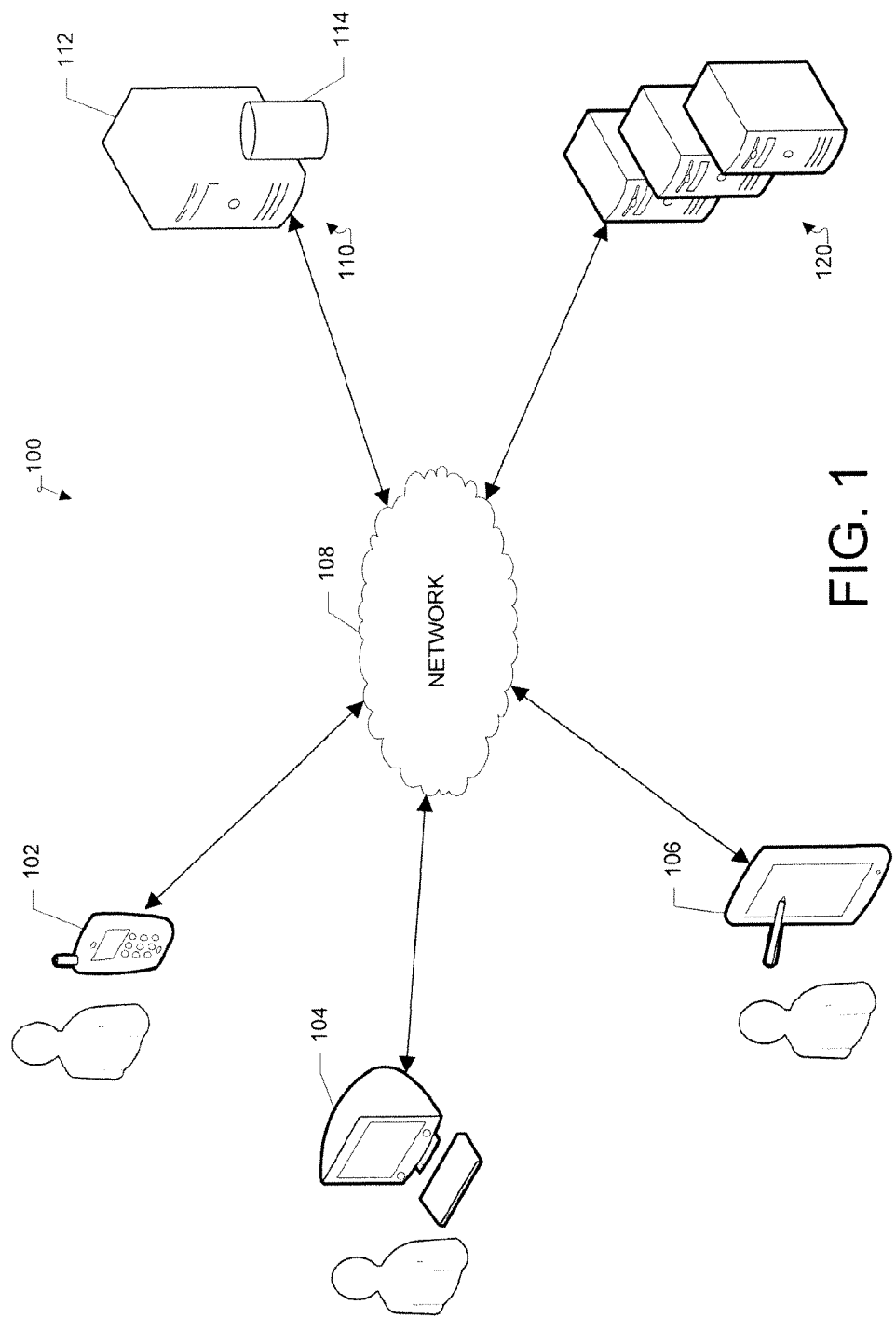
FIG. 1 illustrates an example client-server network environment which provides for facilitating a central account manager.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As used herein, the term "end-user" or "user" encompasses its plain and ordinary meaning, including, but not limited to, the entity that wants to assert a particular identity. The term "service provider", encompasses its plain and ordinary meaning, including, but not limited to is a web site or application that provides some service to the end-user after verifying the end-user's identity using a user identifier or account ("user account") (e.g., a user account provider account, email address, social networking service or other service account username). The user account may for example include a URL or XRI chosen by the end-user to name the end-user's identity at the service (e.g., identity provider, email service, social networking service or other service). A user account provider (e.g., identity provider ("IDP"), email service, social networking service or other service providing a user account) is a service that specializes in registering user accounts. The user account provider may communicate with a service provider and exchange a user account. The user account provider provides the user account authentication (and possibly other identity services). The exchange is enabled by a user-agent, which is the program (e.g., a browser) used by the end-user to communicate with the service provider and user account provider.

When logging into a website or application (service provider), the service provider may provide an option to the user to specify an existing user account at a user account provider for the purposes of authentication. Once the user selects to use an existing user account, the service provider identifies the user account provider associated with the user account and requests that the user account provider authenticate the user using the user account. The user may then be redirected to the user account provider through the user-agent (e.g., browser). Alternatively, all communication may occur in the background through the user-agent and may be presented to the user at the service provider (e.g., browser).

The user account provider authenticates the user, using various authentication methods. For example, the user account provider may prompt the end-user for a password (or other similar authentication mechanism) associated with the user account to authenticate the user. Furthermore, the user account provider may determine if the service provider is a trusted entity to receive various user details (e.g., identity details and other user profile information available to the user account provider), for example, by prompting the user, or automatically determining if the replying entity is a trusted entity.

If authentication is successful and/or the service provider is determined to be a trusted party, the user is redirected back to the service provider along with the user user's identity information and other user data (e.g., the end-user's credentials, profile data, user account). The service provider may then verify the user identity information and/or credentials. Once authentication is completed, the end-user is logged in to the service provider under the user account. The service provider may stores the end-user's user account and/or other session information regarding the end user.

To facilitate an easier login process, the servicer provider (e.g., website or application) may store a list of all user accounts used to log in at the service provider (e.g., at a specific user-agent or across user-agents). When the user goes to the login page of the service provider, the service provider may retrieve and present a list of stored user accounts (optionally including the user's name or picture) and the user can select the desired user account to log into the service provider. A user may use the same user account for various service providers. However, each service is independent of other service providers and stored user accounts at one service provider are not shared to service providers a user may wish to access through a browser or application. For example, when a user goes to a new service provider, he/she has to decide which user account (supported at a user account provider) to use to register and/or login. Furthermore, where the user uses one user account at a service provider, the user will not be able to see other user accounts that are possible options for logging into the service provider.

The present disclosure provides a method and system for facilitating a central account manager that provides a single repository for all of the user's user accounts. The techniques herein may be used after the user has requested to use the techniques, has been given notice and/or has assented. The central account manager may comprise a single domain or otherwise may be accessible from a website or other application. The central account manager may keep a list of all user accounts used by an end-user at a user-agent such as a browser or application or other browsers and applications (e.g., through syncing different user-agents) to access a service provider. Additionally, the central account manager can keep track of any user account used at the user-agent or other user-agent (e.g., not necessarily used with respect to any other service provider as a login but accessed at the browser).

For example, when a user uses a user account at a user account provider, the user account provider may communicate with the central account manager and request that the user account be added to the list of user accounts at the central account manager. In one example, the central account manager, upon receiving the request, determines if the user account is stored at the central account manager. In one example, the user account provider may only request to add the user account when the user account is not already stored at the central account manager. The request may be sent from the user account provider to the central account manager automatically, or the user may manually request to add the user account to the list of user accounts available at the central account manager. Upon receiving the user account, and determining that the user account is not already stored at the central account manager, the central account manager may determine if the user account is an authorized user account. For example, the central account manager may prompt the user for authorization and/or may determine if the user account or user account provider is part of a list of preauthorized identifiers/user account providers. Once the central account manager has received the user account, determined that the user account is not previously stored and/or received authorization from the user, the user account is added to the list of user accounts at the central account manager.

When a user wishes to access a service provider, the service provider contacts the central account manager (e.g., through the user-agent browser or application). In one example, the service provider may store a local listing of user accounts, and may only request the user account list from the central account manager if there are no user accounts locally stored, when the user accounts stored locally are not valid or accessible or upon receiving an explicit user request. The central manager accesses the list of user accounts associated with the user (or all users) at the user-agent (e.g., browser or application), account (e.g., including two or more browsers or applications) or computer. In one example, the user may only be provided with a list, and may not be explicitly redirected to the central account manager; while in another example, the user is explicitly redirected to the central manager service provider or application. The central account manager retrieves all user accounts associated with the user, and one or more user accounts are provided for display to the user for accessing the service provider. Since the user accounts are stored centrally at the central account manager (e.g., without any cookies), the service provider will not have knowledge of the user accounts until the user has made a selection to use a particular user account with respect to the service provider.

In one example, the list of user accounts provided to the user may be filtered by the central account manager based on information regarding the end-user and/or the service provider. In one example, the system may select a user account to provide to the user if it is determined that the user account is supported and may be used to log into the particular service provider. In one example, the central account manager identifies the service provider, and for each stored user account, determines if the user account is supported at the service provider. Additionally, the central account manager may have knowledge of which user accounts were previously used to access the service provider and/or similar service providers (e.g., the information may be stored at the central manager or provided as part of the request by the service provider or some other intermediary). The central account manager may select the previously used user accounts for provision to the end-user.

The user may then view the one or more user accounts, the user can choose any of the user accounts for logging into the service provider. The selected user account is provided to the service provider and the authentication process proceeds to provide the user with access to the service provider using the selected user account.

FIG. 1 illustrates an example client-server network environment which provides for facilitating a central account manager. A network environment 100 includes a number of electronic devices 102, 104 and 106 communicably connected to a server 110 by a network 108. One or more remote servers 120 are further coupled to the server 110 and/or the one or more electronic devices 102, 104 and 106. Server 110 includes a processing device 112 and a data store 114. Processing device 112 executes computer instructions stored in data store 114, for example, to facilitate a central account manager for providing the user with one or more user accounts at electronic devices 102, 104 and 106.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In one example, the electronic devices 102, 104 and 106 store a user-agent such as a browser or application, and further locally store a central account manager list of user accounts. In the example of FIG. 1, electronic device 102 is depicted as a smartphone, electronic device 104 is depicted as a desktop computer, and electronic device 106 is depicted as a PDA.

In some example aspects, server 110 can be a single computing device such as a computer server. In other embodiments, server 110 can represent more than one computing device working together to perform the actions of a server computer (e.g., cloud computing). The server 110 may host the web server communicationally coupled to the browser at the client device (e.g., electronic devices 102, 104 or 106) via network 108. In one example, the server 110 may host the application or code for the central account manager and/or for performing the operations at the local browser for implementing the process described with respect to the central account manager.

Each of the one or more remote servers 120 can be a single computing device such as a computer server or can represent more than one computing device working together to perform the actions of a server computer (e.g., cloud computing). Each of the one or more remote servers 120 may host one or more service providers and/or user account providers. In another example, the remote services 120 may provide code or data for implementing the central account manager. In one embodiment server 110 and one or more remote servers 120 may be implemented as a single server hosting the central account manager and/or one or more service providers (e.g., websites and/or applications). In one example, the server 110 and one or more remote servers 120 may communicate through the user-agent at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

A user interacting with a client device (e.g., electronic devices 102, 104 or 106) may contact a service provider (e.g., hosted at one or more remote servers 120) through a user-agent (e.g., a browser or local application), and request to login or access the service provider. Upon receiving the request, the service provider contacts the central account manager, for example hosted at server 110 (e.g., through the user-agent browser or application). In one example, the service provider may store a local listing of user accounts, and may only request the user account list from the central account manager, if there are no user accounts locally stored or when the user accounts stored locally are not valid or accessible.

Upon receiving the request, the central account manager accesses the list of user accounts associated with the user (or all users at the user-agent or client device). The list of user accounts may be stored locally stored at the client device, for example at the user-agent (e.g., browser or application). The central account manager retrieves all user accounts associated with the user (e.g., stored locally at the user's client device or remotely stored and accessible by the central account manager), and selects one or more user accounts for display to the user for accessing the service provider. In one example, upon receiving the request, the user is explicitly redirected to the central account manager service provider or application; while in another example, the central account manager operates in the background without the user being redirected from the service provider.

Figure 2:
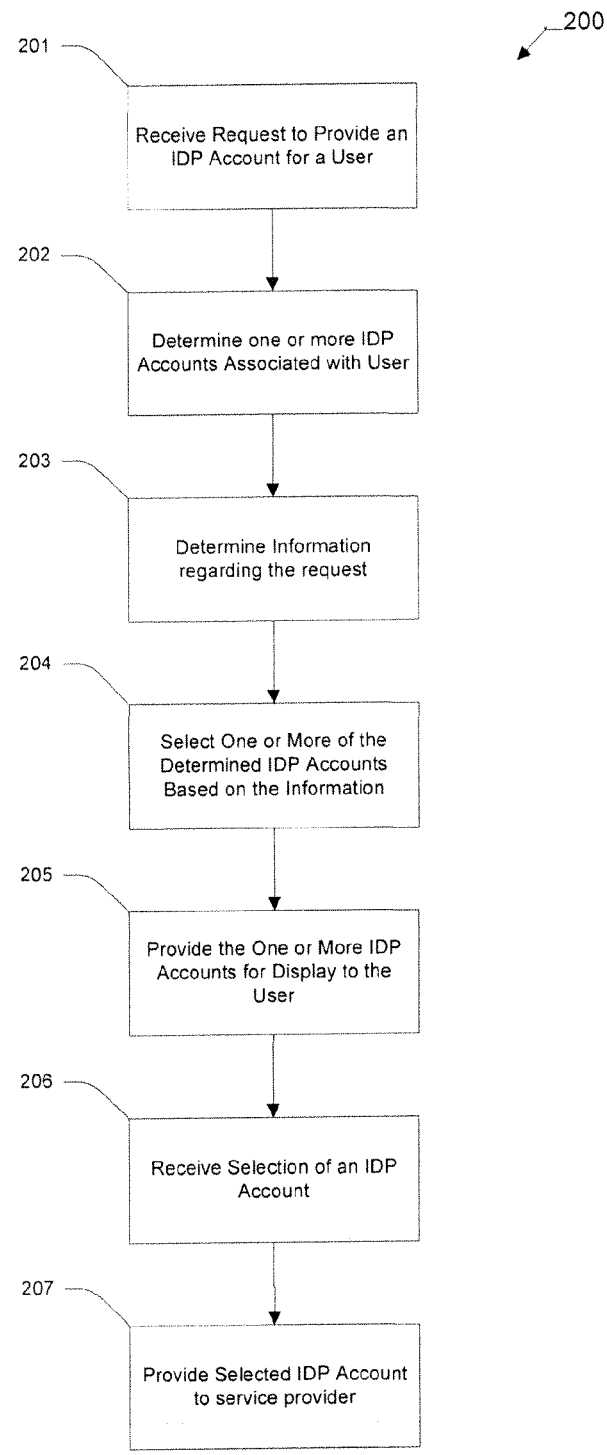
FIG. 2 illustrates a process for providing a user account for accessing a service provider.

FIG. 2 illustrates a process 200 for providing a user account for accessing a service provider. In step 201, the central account manager receives a request to provide a user account associated with a user to a service provider. For example, when a user wishes to access a service provider, the service provider contacts the central account manager (e.g., through the user-agent browser or application) and requests a user account associated with the user. In one example, a selection mechanism may be provided at the service provider (e.g., service provider or application) and the user may select to access the service provider using a user account. Upon receiving the selection from the user, the service provider may issue a request which is then forwarded to the central account manager. In one example, the service provider may store a local listing of user accounts, and may only request the user account list from the central account manager, if there are no user accounts locally stored, when the user accounts stored locally are not valid or accessible or upon receiving an explicit request (e.g., from the user).

In step 202, the central account manager determines alone or more user accounts associated with the user and stored at the central account manager. For example, the central account manager determines one or more user accounts that have been previously stored (e.g., locally and/or in the browser). In one example, the central manager accesses the list of user accounts associated with the user (or all users) at the user-agent (e.g., browser or application), account (e.g., including two or more browsers or applications) or computer. In one example, the central account manager provides a local central repository for all user accounts used at the user's client device or user-agent (e.g., browser or other application). In one example, the user accounts stored at the central account manager include one or more user accounts used to access one or more service providers. Additionally, user accounts accessible by the central account manager may include user accounts that are used by a user independent of a service provider. An example process for adding one or more user accounts to the listing of user accounts associated with a user, user-agent and/or client device is described in further detail below with respect to FIG. 3.

In step 203, the central account manager determines information regarding the service provider request. In one example, the information may be provided as part of the request or in response to a follow-up request from the central account manager. Additionally, information regarding the service provider and/or user may be stored locally at the central account manager, user-agent or otherwise accessible by the central account manager. The information may include information regarding the service provider such as user accounts previously used at the service provider, user accounts or user account providers supported by the service provider and/or historical information regarding user accounts or user account providers most likely to be used at the service provider. For example, the service provider may store user accounts previously used by the user or similar users, and may provide such information to the central account manager. In addition, the information may include information regarding the user such as preferred user accounts, frequently used user accounts and/or other similar preferences. Additionally, the information may include information regarding similar service providers or users.

In step 204, the central account manager selects one or more of the user accounts determined in step 202. In one example, the selection may for example be based on the information determined in step 204. In one example, the selection may be based on a combination of criteria such as those described above (e.g., previously used with respect to service provider or similar service provider, supported by the service providers, most frequently used accounts, etc.), where one or more criteria may be weighted. The central account manager may rank the user accounts based on the criteria and may provide one or more of the user accounts based on the ranking. For example, the central account manager may select and display a list of user accounts according to the ranking.

In one example, information regarding the service provider, user or otherwise relating to the request may not be available or considered and/or the central account manager may skip or surpass one or more of steps 203 and 204 and may provide some or the entire list of user accounts to the user (e.g., based on random selection).

Figure 4:
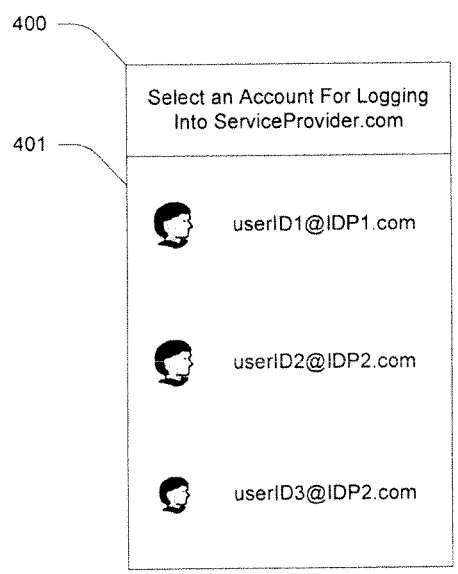
FIG. 4 illustrates an example user interface that may be displayed to the user in response to a request to access a service provider.

In step 205, the central account manager provides the selected one or more user accounts in response to the request. The central account manager may, for example, generate a listing of the user accounts for display to the user for accessing the service provider. An example user interface displaying a listing of user accounts is illustrated in FIG. 4, discussed in further detail below. In one example, the user may only be provided with the list, and may not be explicitly redirected to the central account manager; while in another example, the user is explicitly redirected to the central manager service provider or application. Since the user accounts are stored centrally at the central account manager (e.g., without any cookies), the service provider will not have knowledge of the user accounts until the user has made a selection to use a particular user account with respect to the service provider.

In step 206, a selection of a user account from the one or more user accounts is received. The user may view the one or more user accounts and choose any of the user accounts for logging into the service provider. In step 207, the selected user account is provided to the service provider and the authentication process proceeds to provide the user with access to the service provider using the selected user account.

Figure 3:
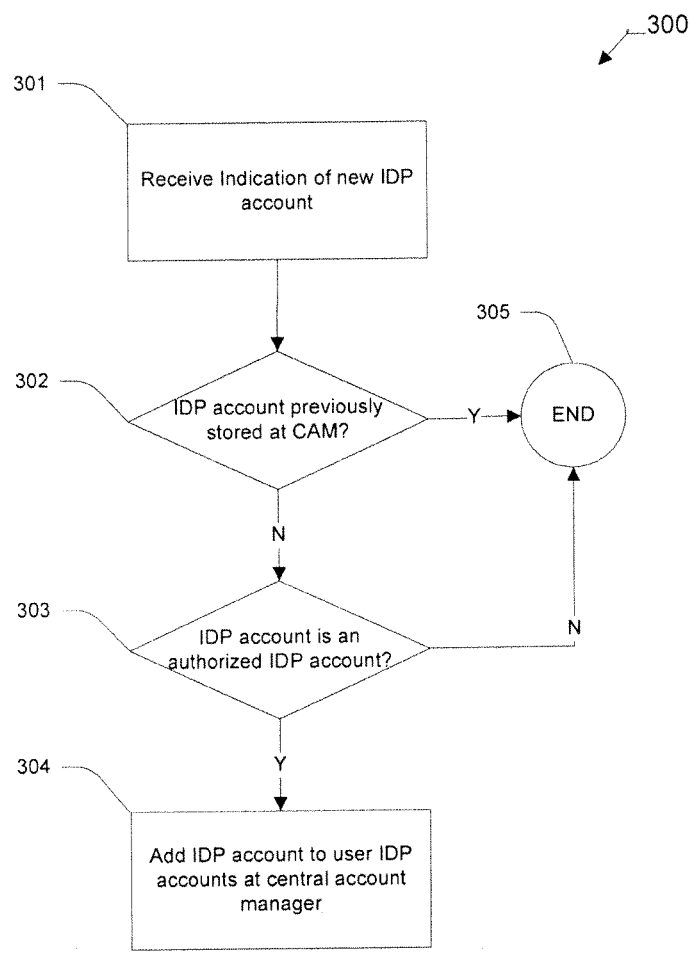
FIG. 3 illustrates a flow diagram of an example process for adding one or more user accounts at the central account manager.

FIG. 3 illustrates a flow diagram of an example process 300 for adding one or more user accounts at the central account manager. In step 301 the central account manager receives an indication of a new user account being used by the user at the user-agent (e.g., browser or application), or client device. The user account may be used in association with a service provider or may otherwise be accessed (e.g., at the user account provider independent of a service provider) at the user-agent, or client device of the user. In one example, the user-agent detects the user accessing a user account and provides the user account to the central account manager.

In step 302, the central account manger determines if the user account was previously stored at the central account manager. In one example, the central account manager is only notified of a new user account when the user account is a new user account (e.g., has not been previously stored). The central account manager may be notified of the new user account in response to a request. The request may be sent from a user account provider or service provider to the central account manager automatically, or the user may manually request to add the user account to the list of user accounts at the central account manager.

If, in step 302, the central account manager determines that the user account is not already stored at the central account manager, the process continues to step 303. In step 303, the central account manager may determine if the user account is an authorized user account. For example, the central account manager may prompt the user for authorization (e.g., ask the user to confirm whether to add the account to the central account manager) and/or may determine if the user account or user account provider is part of a list of preauthorized user accounts/user account providers. If the central account manager determines that the user account is authorized, the user account is added to the list of user accounts at the central account manager in association with the user, user-agent or client device of the user in step 304. Alternatively, if the central account manger determines that the user account was previously stored at the central account manager (in step 302) or that the user account is not authorized (in step 303); the process terminates in step 305.

FIG. 4 illustrates an example user interface 400 which may be displayed to the user in response to a request to access a service provider. As shown the user interface 400 comprises a window showing a listing 401 of one or more user accounts retrieved, for example, according to the process 200 described above. The list may be displayed at the service provider (e.g., on top of the service provider window or as part of the service provider window) or may be displayed on a separate window (e.g., a central manager window).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
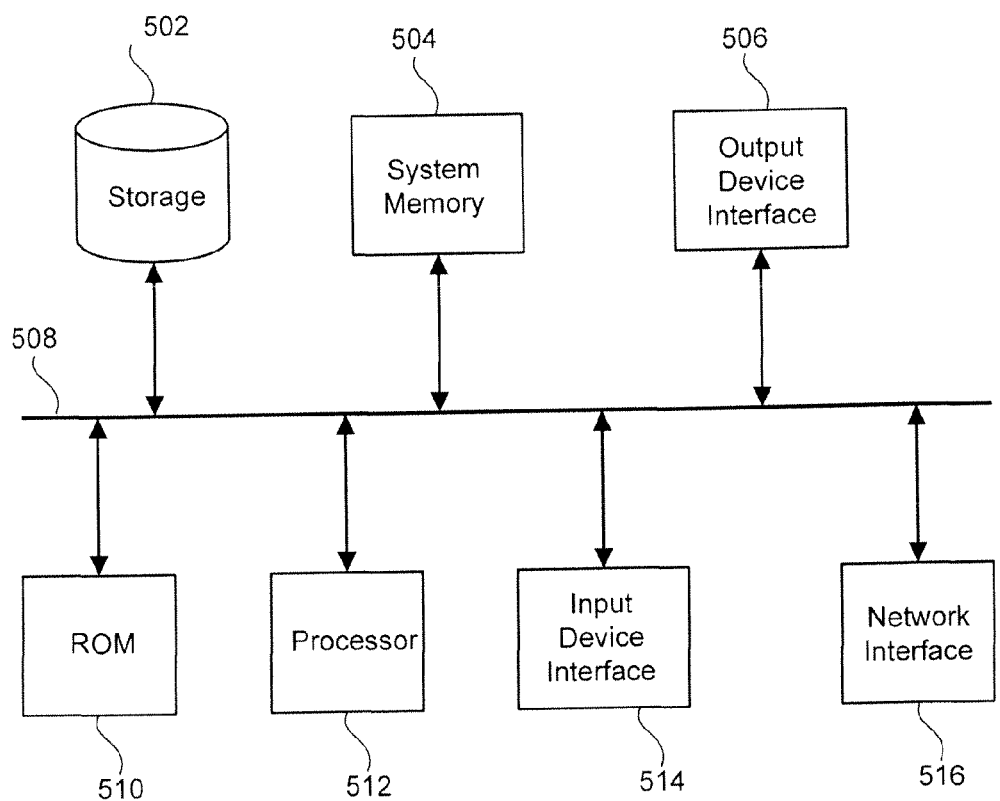
FIG. 5 conceptually illustrates an electronic system with which some implementations of the subject technology are implemented.

FIG. 5 conceptually illustrates an electronic system with which some implementations of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for facilitating a central account manager according to various embodiments. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure. Features under one heading may be combined with features under one or more other heading and all features under one heading need not be use together. Features under one heading may be combined with features under one or more other heading and all features under one heading need not be use together.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method comprising:
receiving, using one or more computing devices, a request from a first service provider, at a central account manager independent from the first service provider, to provide a user account for a user logging into the first service provider;
retrieving a listing of user accounts maintained at the central account manager and associated with the user at one or more user account providers, wherein at least one user account of the listing of user accounts is independent from the first service provider;
selecting one or more user accounts from the listing of user accounts based on information associated with the request;
selecting, using the one or more computing devices, a first user account of the one or more user accounts, wherein the first user account is associated with the first service provider; and
providing, using the one or more computing devices, the selected first user account to the first service provider in response to the request.

2. The method of claim 1, wherein the user accounts associated with the user comprise one or more of user accounts previously accessed by the user, user accounts previously used by the user to access a service provider, or user accounts provided by the user to the central account manager.

3. The method of claim 1, wherein the information associated with the request comprises one or more of information regarding the first service provider, information regarding the user, or information regarding similar service providers or similar users.

4. The method of claim 3, wherein the information regarding the first service provider comprise one or more of the user accounts supported by the first service provider or user accounts previously used in association with the first service provider.

5. The method of claim 1, further comprising:
receiving an indication of a new user account associated with the user; and
adding the new user account to the listing of user accounts at the central account manager.

6. The method of claim 5, wherein the indication is received in response to the user account being used to access a service provider.

7. The method of claim 5, wherein the indication is received in response to the user account being accessed independent of a service provider.

8. The method of claim 5, further comprising:
determining whether the new user account is an authorized user account, wherein the new user account is added when it is determined that the new user account is an authorized user account.

9. The method of claim 1, wherein the listing of user accounts associated with the user includes at least one user account not previously used to access the first service provider.

10. The method of claim 1, wherein the service provider comprises one of a website or application that requires user authentication before providing the user with access.

11. The method of claim 10, wherein the user account is used at the service provider to authenticate the user to provide the user with access to the service provider.

12. The method of claim 1, wherein the central account manager is remote and independent from the service provider.

13. A system comprising:
one or more processors; and
a machine-readable medium comprising instructions stored therein, which when executed by the processors, cause the processors to perform operations comprising:
 receiving a request from a service provider, at a central account manager, to provide a user account associated with one or more user account providers for a user logging into the service provider;
 retrieving a listing of user accounts maintained at the central account manager, the listing of user accounts comprising one or more user accounts of the user;
 ranking the one or more user accounts of the listing of user accounts based on information associated with the request; and
 providing a first user account of the one or more user accounts to the service provider in response to the request.

14. The system of claim 13, the operations further comprising:
providing the listing of user accounts for display to the user according to the ranking.

15. The system of claim 14, wherein the information associated with the request comprises information regarding the first service provider, information regarding the user, and information regarding similar service providers or similar users.

16. The system of claim 15, wherein the information regarding the first service provider comprise one or more of the user accounts supported by the first service provider or user accounts previously used in association with the first service provider.

17. The system of claim 13, the operations further comprising:
receiving an indication of a new user account associated with the user;
determining whether the new user account is an authorized user account; and
adding the new user account to the listing of user accounts at the central account manager when it is determined that the new user account is an authorized user account.

18. The system of claim 13, the operations further comprising:
providing the listing of user accounts for display to the user; and
receiving a selection of the first user account from the user.

19. A non-transitory machine-readable medium comprising instructions stored therein, which when executed by a machine, cause the machine to perform operations comprising:
receiving a request from a first service provider, at a central account manager, to provide a user account for a user logging into the first service provider, wherein the listing of user accounts comprises one or more user accounts maintained at one or more user account providers wherein at least one user account of the listing of user accounts is independent from the first service provider;
receiving a selection of a first user account of the one or more user accounts; and
providing the selected first user account to the first service provider in response to the request, wherein the first service provider requires user authentication before providing the user with access and wherein the selected first user account is used at the first service provider to authenticate the user and provide the user with access to the first service provider.

* * * * *